US009339909B2

(12) United States Patent
Affaticati et al.

(10) Patent No.: US 9,339,909 B2
(45) Date of Patent: May 17, 2016

(54) WORKING MACHINE FOR MAKING GEARS

(75) Inventors: Artemio Affaticati, Busto Arsizio (IT); Vito Perrone, Crema (IT)

(73) Assignee: SAMP S.p.A. con Unico Socio, Bentivoglio (IT)

( * ) Notice: Subject to any disclaimer, the term of this patent is extended or adjusted under 35 U.S.C. 154(b) by 869 days.

(21) Appl. No.: 13/386,660

(22) PCT Filed: Jul. 21, 2010

(86) PCT No.: PCT/IB2010/001763
§ 371 (c)(1),
(2), (4) Date: Apr. 6, 2012

(87) PCT Pub. No.: WO2011/010209
PCT Pub. Date: Jan. 27, 2011

(65) Prior Publication Data
US 2012/0189395 A1    Jul. 26, 2012

(30) Foreign Application Priority Data

Jul. 23, 2009 (IT) .............................. BO2009A0478

(51) Int. Cl.
*B23Q 39/00* (2006.01)
*B23Q 1/48* (2006.01)
(Continued)

(52) U.S. Cl.
CPC .............. *B23Q 39/028* (2013.01); *B23F 1/065* (2013.01); *B23F 5/22* (2013.01); *B23F 17/006* (2013.01);
(Continued)

(58) Field of Classification Search
CPC .. B23F 17/006; B23Q 39/028; B23Q 39/029; Y10T 409/10159; Y10T 409/102703; Y10T 409/102862; Y10T 409/103021; Y10T 409/10318; Y10T 409/103339; Y10T 409/103498; Y10T 409/103657; Y10T 409/305264; Y10T 29/5176
USPC .................. 29/56.5; 409/11, 18–24, 55, 158; 451/147, 250
See application file for complete search history.

(56) References Cited

U.S. PATENT DOCUMENTS 4,850,155 A * 7/1989 Sulzer .............................. 451/47
4,961,289 A * 10/1990 Sulzer ............................. 409/11
(Continued)

FOREIGN PATENT DOCUMENTS

CN        2912869 Y      6/2007
DE   10 2006 022288 A1   11/2007
(Continued)

OTHER PUBLICATIONS

Office Action issued in P.R.C. Patent Appl. No. 201080042359.5, dated Jan. 15, 2014 (with translation).
(Continued)

*Primary Examiner* — Erica E Cadugan
(74) *Attorney, Agent, or Firm* — Matthew A. Pequignot; Pequignot + Myers LLC

(57) ABSTRACT

A machine for making gears.
The machine comprises a piece-holder unit and an operating unit equipped with an operating head provided with at least one tool for machining a piece. Moreover, one piece-holder unit and the operating unit are provided with relative motion with respect to each another in a direction. The machine is characterized in that the operating unit is suitable to move, in a direction substantially perpendicular to the direction, and in that the tool is mounted on a slide provided with a tangential motion defined by a direction.

27 Claims, 4 Drawing Sheets

(51) Int. Cl.
  *B23F 5/22* (2006.01)
  *B23F 17/00* (2006.01)
  *B23F 23/00* (2006.01)
  *B23Q 39/02* (2006.01)
  *B23F 21/00* (2006.01)
  *B23F 1/06* (2006.01)
  *B23Q 1/62* (2006.01)

(52) U.S. Cl.
  CPC ............ *B23F 21/005* (2013.01); *B23F 23/006* (2013.01); *B23Q 1/626* (2013.01); *B23Q 39/029* (2013.01); *Y10T 29/5176* (2015.01); *Y10T 409/10159* (2015.01); *Y10T 409/10318* (2015.01); *Y10T 409/101431* (2015.01); *Y10T 409/103021* (2015.01); *Y10T 409/103498* (2015.01); *Y10T 409/103657* (2015.01); *Y10T 409/305264* (2015.01)

(56) References Cited

U.S. PATENT DOCUMENTS

| | | | |
|---|---|---|---|
| 6,618,917 B2 * | 9/2003 | Sugiura et al. | 409/11 |
| 7,103,973 B2 * | 9/2006 | Wolff et al. | 29/56.5 |
| 8,707,528 B2 * | 4/2014 | Ozdyk et al. | 29/56.5 |
| 2012/0163935 A1 * | 6/2012 | Affaticati et al. | 409/6 |
| 2012/0180277 A1 * | 7/2012 | Affaticati et al. | 29/56.5 |

FOREIGN PATENT DOCUMENTS

| | | | |
|---|---|---|---|
| EP | 0 278 512 A1 | | 8/1988 |
| JP | 58-165917 A | * | 10/1983 |
| JP | 63-053622 U | * | 4/1988 |

OTHER PUBLICATIONS

International Search Report, PCT/IB/2010/001763, Oct. 19, 2010.

* cited by examiner

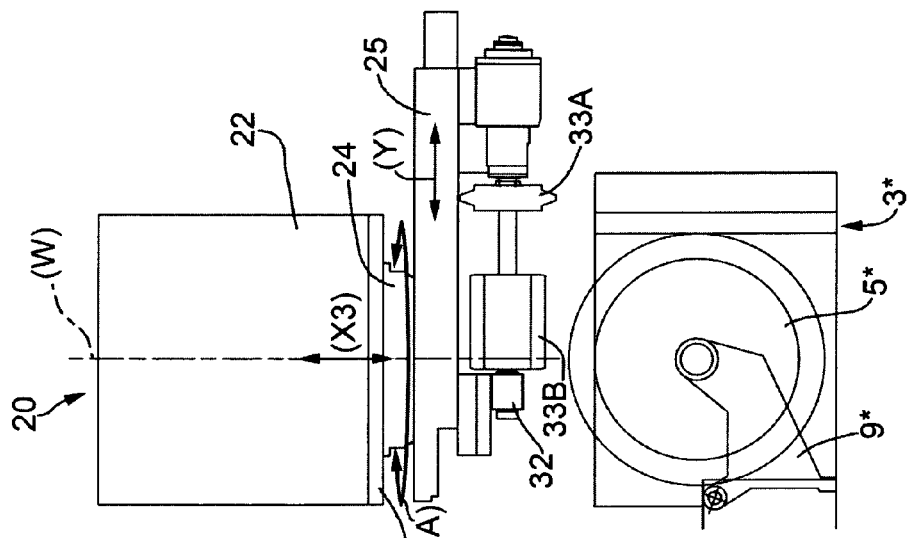
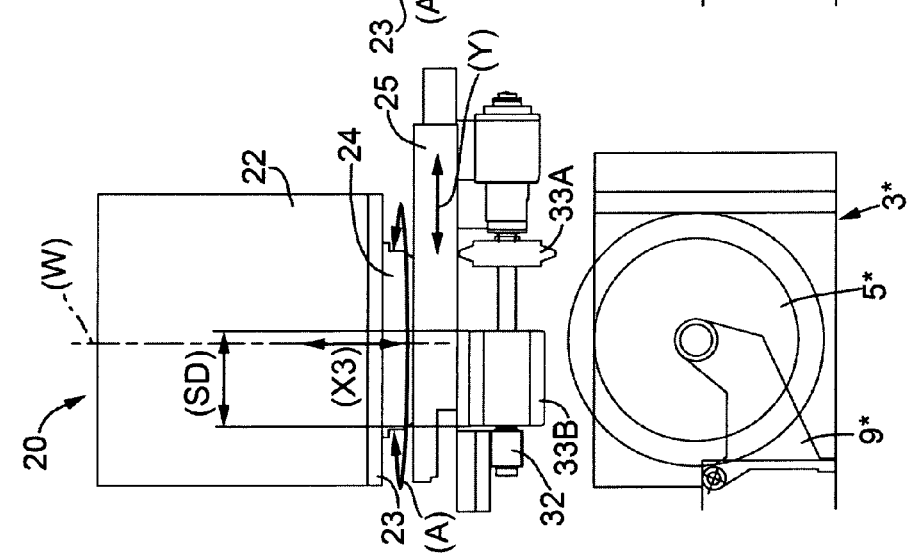
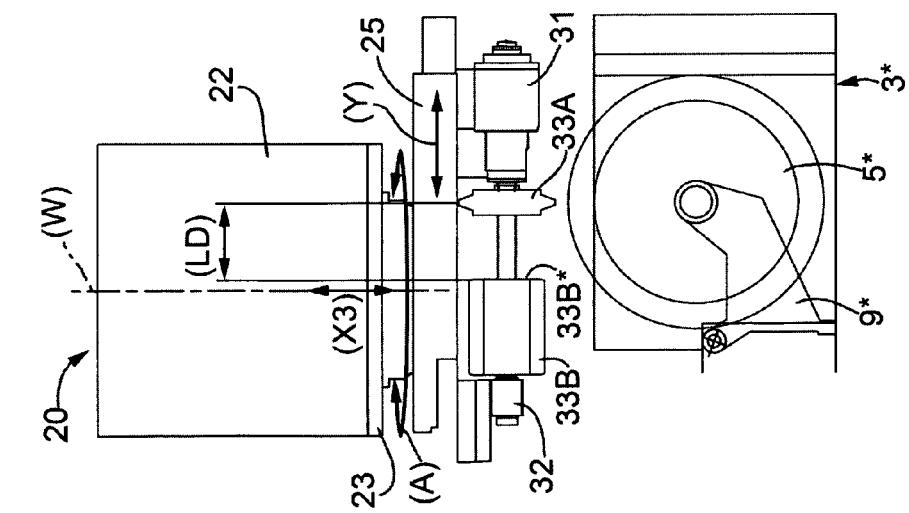
FIG. 3A
FIG. 3B
FIG. 3C
FIG. 3

Auxiliary Devices for Machining and/or Controlling the Piece Mounted on the Relative Piece-Holder Table 5*, 5**

FIG. 4

WORKING MACHINE FOR MAKING GEARS

RELATED APPLICATION DATA

This application is the national stage entry of International Appl. No. PCT/IB2010/001763, which claims priority to Italian Patent Application No. BO2009A000478, filed on Jul. 23, 2009. All claims of priority to these applications are hereby made, and each of these applications is hereby incorporated in its entirety by reference.

TECHNICAL FIELD

The present invention relates to a working machine for making gears.

BACKGROUND ART

In the gear manufacturing sector, a known method of making gears consists of machining a set of teeth on a corresponding piece and subsequently grinding the toothed piece. Each gear cutting and grinding process comprises a respective rough machining phase and a finishing phase of the piece.

Generally, the gear cutting or grinding process is performed by a working machine that comprises a piece-holder table mounted so as to rotate about its own longitudinal vertical axis and an operating head, which is provided with at least one tool for machining the piece, and is movable along a guiding device that extends in a direction substantially transversal to the longitudinal axis of the piece-holder table.

Different tools can be used to perform the rough machining and finishing processes in order to increase machine productivity. It is thus possible to optimize each machining process and cut cycle times. In general, more and more often to perform a complete gear cutting process it is becoming necessary to equip a single tool-carrier with several tools that can perform different machining processes in a single position. Normally the number of tools that can be used and their width is limited by the length of the stroke of the operating head.

Nowadays, the need has arisen to produce gears with particularly large nominal diameters for use in special applications, such as, for instance, in the production of wind power generators.

DISCLOSURE OF INVENTION

Therefore, the main object of the present invention is to provide a working machine for making gears that is able of machining particularly large pieces.

Moreover, to increase the production capacity of the working machine there are provided at least two working stations, so that while a first piece is machined in a first working station, a corresponding second piece is centered and/or the corresponding piece-holder unit of the second working station is serviced in the second working station in "masked time".

A tool changing station may also be provided next to at least one of the working stations.

In at least one embodiment, there is provided a machine (1) according to one of the herein described embodiments, further characterized in that it includes a slide (25) mounted on a pivoting element (24) suitable to move in a direction (X3) substantially parallel to the at least one direction (X1, X2), and perpendicular to the direction (Y1).

Thus, according to the present invention there is provided a working machine for making gears as claimed in the appended claims.

BRIEF DESCRIPTION OF THE DRAWINGS

The present invention will now be described with reference to the accompanying drawings, illustrating a non-limiting embodiment thereof, in which:

FIG. 3 (FIGS. 3A, 3B, 3C) illustrates, by way of example, some operating parameters of an operating head mounted on the working machine illustrated in FIGS. 1, 2; and FIG. 4 schematically shows a feature of the present invention.

BEST MODE FOR CARRYING OUT THE INVENTION

Figure 1:
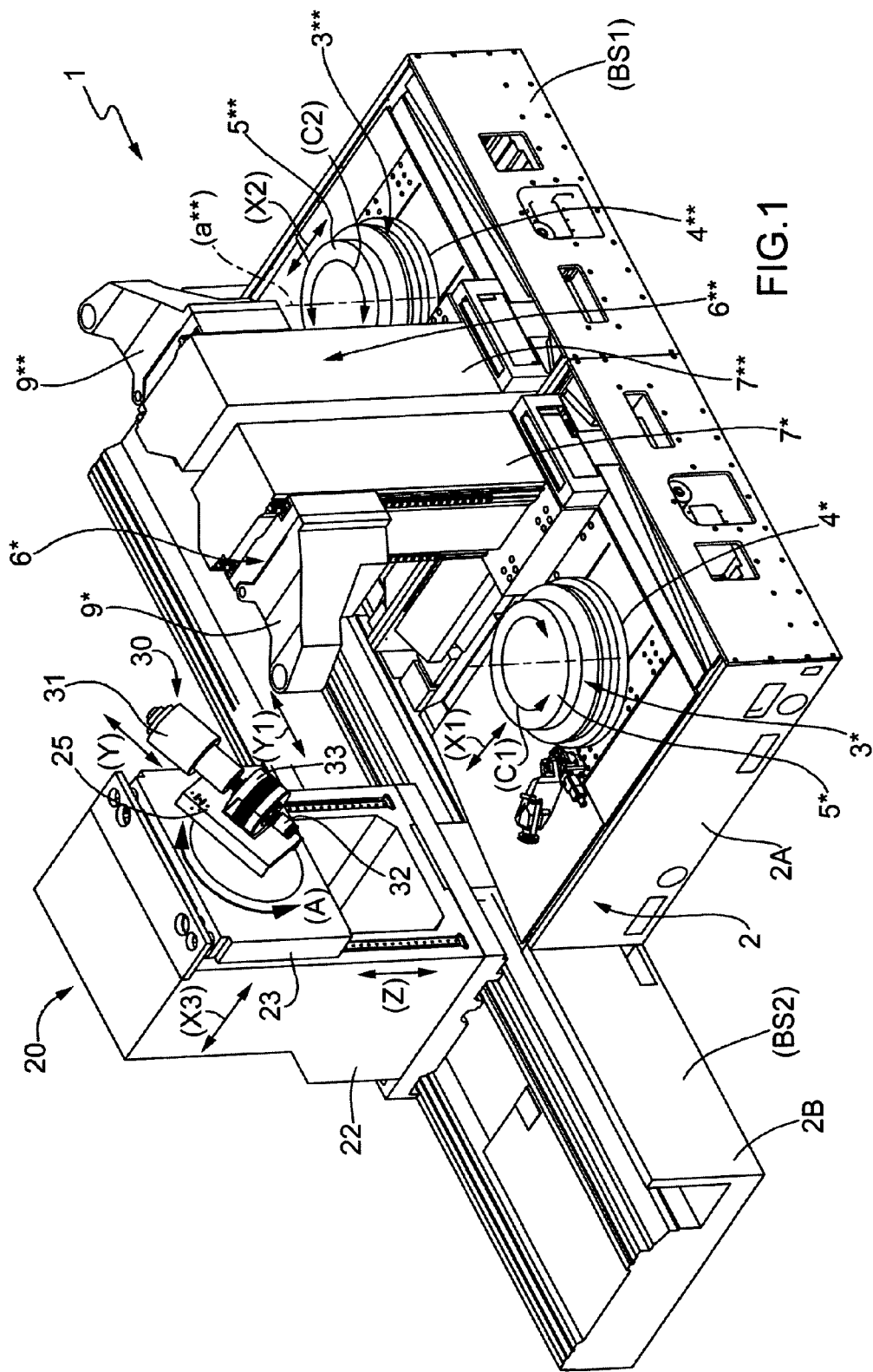
FIG. 1 is a schematic perspective view of a preferred embodiment of the working machine for making gears according to the present invention.
Figure 2:
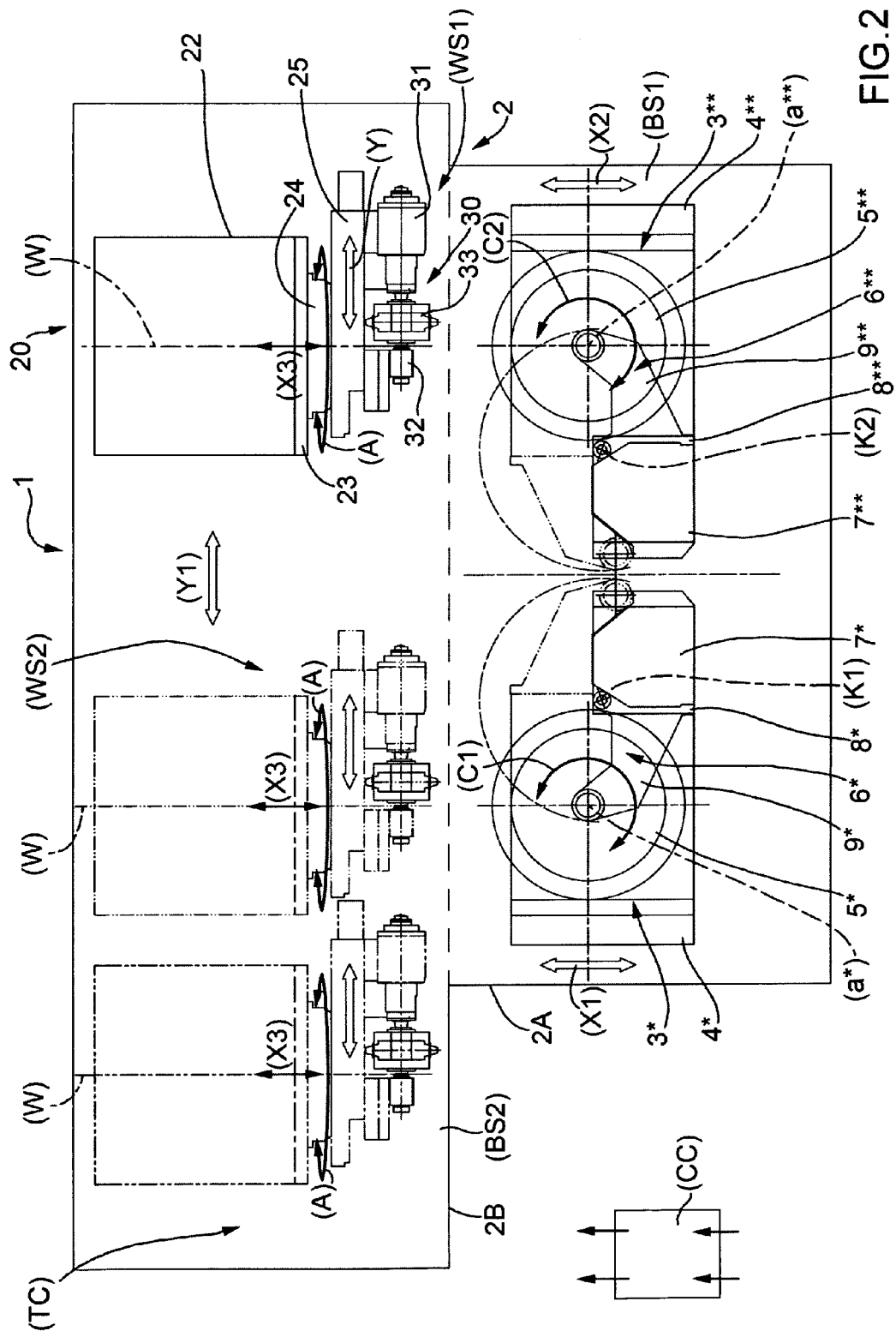
FIG. 2 is a plan view of the working machine illustrated in FIG. 1.

With reference to FIGS. 1 and 2, designated as a whole by number 1 is a machine for making gears (which are not illustrated) comprising a support frame 2.

The frame 2 may ideally be conceived as consisting of a first portion 2A in which there is a first base (BS1) on which the devices to support, clamp and move the pieces to be machined are arranged, and a second portion 2B, in which there is a second base (BS2) on which the devices to support, clamp and move the rough machining and finishing tools suitable to produce the gears (see below) are arranged.

As illustrated in FIGS. 1, 2, two piece-holder units 3* and 3** are mounted on the first portion 2A of the frame 2, each of which comprises a relative slide 4*, 4**.

Each slide 4*, 4** is slidingly coupled to a relative guiding device (not illustrated) arranged beneath the portion 2A of the frame 2 so as to move, with respect to the portion 2A and driven by a known actuating device that is not illustrated, in a straight line in the direction (X1), respectively, (X2)2 from and towards the second portion 2B of the frame 2. Each slide 4*, 4** supports a respective piece-holder table 5*, 5** which is suitable to support a large, substantially cylindrical piece (not illustrated) on which the gear cutting and grinding operations are to be performed.

Moreover, each piece-holder table 5*, 25** is also arranged so as to rotate (driven by a respective actuating device that is known and is not illustrated) about a respective vertical axis (a*), (a**), in a respective direction (C1), (C2) so that the machine 1 can machine one tooth of the gear at a time.

Each axis (a*), (a**) is transversal to the respective direction (X1), (X2).

Moreover, each slide 4*, 4** is suitable to be locked with respect to the part 2A of the frame 2 by a corresponding locking device that is not illustrated.

With reference to FIG. 1, each piece-holder unit 3*, 3** cooperates with an operation unit 6*, 6** comprising a respective vertical column 7*, 7** which extends upwards from the portion 2A in a direction substantially parallel to the axes (a*) and (a**).

A respective slide 8*, 8** is slidingly coupled to each vertical column 7*, 7** so as to move along the vertical column 7*, 7**, driven by a known actuating device that is not illustrated, in a straight line in a respective direction transversal, respectively, to the direction (X1), or to the direction (X2).

Each operation unit 6*, 6** comprises, in turn, a relative support arm 9*, 9** which is hinged to the respective slide 8*, 8** so as to rotate, with respect to said corresponding slide 8*, 8** and driven by a known actuating device that is not illustrated, about a respective fulcrum axis (K1), (K2) (FIG. 2). Incidentally, the support arm 9*, 9** can rotate until assuming the configuration indicated with the dashed line in FIG. 1.

Each support arm 9*, 9** is suitable to support respective auxiliary devices for machining and/or controlling the piece mounted on the relative piece-holder table 5*, 5**.

The working machine 1 is also provided with a further operating unit 20 which uses the portion 2B of the frame 2.

Said portion 2B comprises, as mentioned previously, the second elongated base (BS2), which is next to the portion 2A and the ends of which protrude from said portion 2A.

The operating unit 20 comprises a first horizontal slide 22, which extends upwards from the second base (BS2), and is slidingly coupled (for example by means of a rail system) to said second base (BS2) so as to move, along the second base (BS2) and driven by a known actuating device that is not illustrated, in a straight line in a direction (Y1).

A second vertical slide 23 is slidingly coupled to the first horizontal slide 22 so as to move, along the horizontal slide 22 and driven by a known actuating device that is not illustrated, in a straight line in a vertical direction (Z) transversal to the direction (Y1). On the second slide 23 there is a pivoting tube 24 which, driven by a known actuating device that is not illustrated, rotates about an axis (W) in a direction (A). The pivoting tube 24 is suitable to be locked by means of a locking assembly (not illustrated) comprising a plurality of locking devices uniformly distributed about the axis (W).

Again with reference to FIG. 1, the operating unit 20 also comprises a third slide 25 slidingly coupled to the pivoting tube 24. Said third slide 25 moves in a straight line in a tangential direction (Y) driven by a known actuating device that is not illustrated. The actual orientation of the movements of the third slide 25 clearly also depends on the angular position of the pivoting tube 24 which, as explained previously, is able to rotate in the direction (A).

Lastly, the third slide 25 supports an operating head 30 comprising an electric motor 31, which extends in the direction (Y), and is provided with an output shaft 32 to which at least one tool 33 is keyed for machining said pieces.

During use, the operating head 30 is moved along the second base (BS2) in the direction (Y1) between two working stations (WS1), (WS2), inside each of which the head 30 faces a piece-holder unit 3**, 3* to machine the piece (not illustrated) mounted on the respective piece-holder table 5**, 5*.

As it continues to travel in the direction (Y1) the operating head 30 is able to move completely outside the machining station (WS2) and enter a tool change station (TC).

In the station (TC) the operating head 30 moves into a portion of the second base (BS2) which protrudes with respect to the first base (BS1) so that an operator (not illustrated) can conveniently change the tool 33.

The operation to change the tool 33 in the tool change station (TC) can be performed manually, or by means of a mechanized tool loading/unloading system (not illustrated).

In each of the two working stations (WS1), (WS2), the machine 1 is able to perform two machining processes on each piece (not illustrated) supported by the relative piece-holder table 5** and 5*, i.e.:

gear cutting, to produce the teeth of the gears (not illustrated), which normally comprises a first rough machining stage and a second finishing phase; and a grinding process to grind the teeth made during the previous gear cutting process and which normally also comprises a first rough machining stage and a second finishing phase.

The movements and locking of the two piece-holder units 3*, 3** and of the operating head 30 are controlled and monitored by an electronic control unit (CC) (FIG. 2).

One of the many advantages of the machine 1 derives from the fact that when the operating head 30 is facing the piece-holder unit 3**, and thus occupies the working station (WS1), the necessary centering operations can be performed on the piece supported by the piece-holder unit 3* in "masked time" also, if necessary, using any control devices (not illustrated) supported by the support arm 9*.

Moreover, when the operating head 30 occupies the working station (WS1), an operator can also service the piece-holder unit 3*, replace the control devices supported by the support arm 9*, etc., in "masked time".

Clearly, similar advantages are achieved when the operating head 30 occupies the working station (WS2). In this case the piece supported by the piece-holder unit 3 can be centered in "masked time" also, if necessary, using any control devices (not illustrated) supported by the support arm 9. Moreover, when the operating head 30 occupies the machining station (WS2), an operator can also service the piece-holder unit 3, replace the control devices supported by the support arm 9, etc., in "masked time".

Clearly, the operating head 30 and/or the slides 4*, 4** can be mounted on different combinations of units other than those described above without departing from the scope of the present invention.

FIGS. 3A, 3B, 3C illustrate the sequence of machining operations performed by a pair of tools 33A, 33B on the machine 1 described above.

In particular, the tool 33A is an insert milling cutter and the tool 33B is a gear hob 33B.

The type of tool 33A or 33B that is used at a certain stage of the process is clearly chosen according to the material used to make the piece being machined, the type of machining process, etc.

When a tool 33A, 33B is active, in that it is machining the piece, the other tool 33B, 33A is inactive, in that it is not working, and must not touch the piece for any reason whatsoever.

The "total working stroke" (CTL), necessary to perform the "combined machining process" using more than one tool, is given by the sum of the "longitudinal distance" (LD) (FIG. 3C) between a front face 33B* of the tool 33B and the center of the tool 33A and of the "shifting distance" (SD) (FIG. 3B), i.e. ultimately by the width of the tool that is used.

In other words, the "total working stroke" (CTL) is defined by the sum of the distances between the single tools plus their width.

The "total working stroke" (CTL) is normally obtained by moving the slide 25 in the direction (Y).

Said "total working stroke" (CTL) may be insufficient for machining particularly large pieces, such as the gears used in wind power generators. When there are two tools 33A, 33B on the operating head 30, an insufficient "total working stroke" (CTL) would also result in the phenomenon known as "heeling", with the tool 33A still on the piece being machined by the tool 33B. In other words, in machines with insufficient "total working strokes" (CTL), when machining pieces with a large diameter one of the two tools, for example the tool 33A, would not be able to move completely away from said piece when it is being machined by the tool 33B; the tool 33A would therefore clearly damage the piece. The same would happen with the tool 33A working when the tool 33B ought not to be working.

In this case the particular layout of the machine 1 illustrated in FIG. 1 is useful as the "total working stroke" (CTL) can be fictitiously "elongated" by moving the entire operating unit 20 in the direction (Y1).

The elongation of the "total working stroke" (CTL) of the operating unit 20 is a significant advantage offered by the layout of the machine 1 illustrated in FIG. 1.

The main advantage of the working machine according to the invention essentially consists of the significant elongation of the "total working stroke" (CTL) in order to machine pieces with particularly large diameters, and also to prevent the phenomenon known as "heeling" when the operating head supports more than one tool.

The invention claimed is:

1. A machine (1) for making gears,
    the machine (1) comprising at least two piece-holder units (3*; 3**) and at least one operating unit (20) comprising a first slide (22); said at least one operating unit (20) being equipped with at least one operating head (30) provided with at least one tool (33; 33A, 33B) for machining a piece; said at least two piece-holder units (3*; 3**) and said at least one operating unit (20) each being structurally configured such that each of said at least two piece-holder units are capable of moving in at least a first direction (X1, X2) relative to a position of said at least one operating unit, with each piece-holder unit of said at least two piece-holder units also being moveable with respect to the other piece-holder unit in said first direction (X1, X2);
    wherein said at least one operating unit (20) is suitable to move in a second direction (Y1) substantially perpendicular to said at least first direction (X1, X2);
    wherein said at least one operating unit (20) includes a second slide (25) mounted on a pivoting element (24), said pivoting element (24) being moveable in a third, rotational direction (A) about an axis (W);
    wherein said at least one tool (33; 33A, 33B) is mounted on said second slide (25), said second slide (25) being configured to move in a fourth direction (Y) which is tangential relative to said axis (W);
    wherein said pivoting element (24) is mounted on a third slide (23), said third slide (23) being configured to move in a fifth, vertical direction (Z) extending vertically and transversal to said second direction (Y1).

2. A machine (1) as claimed in claim 1, wherein said pivoting element (24) is further configured to move in a sixth direction (X3) which is substantially parallel to said at least first direction (X1, X2), and perpendicular to said second direction (Y1).

3. A machine (1) as claimed in claim 1, characterized in that said machine further comprises at least two working stations comprising a first working station (WS1) and a second working station (WS2), said at least two working stations being so configured such that while a first piece is machined in a first working station (WS1), a corresponding second piece is capable of being centered on one respective piece-holder unit of said at least two piece-holder units, and/or a respective piece-holder unit (3*), of said at least two piece-holder units, which corresponds to said second working station (WS2), can be serviced in said second working station (WS2).

4. A machine (1) as claimed in claim 3, further characterized in that said at least one operating unit (20), as the sole operating unit, is configured to move between said at least two working stations ((WS1), (WS2)).

5. A machine (1) as claimed in claim 1, further characterized in that said machine includes at least one tool change station (TC) located next to at least one working station ((WS1), (WS2)).

6. A machine (1) as claimed in claim 1, further characterized in that said at least one operating unit (20) is configured to move to a position to reach a tool change station ((TC)), wherein said at least one tool (33; 33A, 33B) is changed.

7. A machine (1) as claimed in claim 6, characterized in that said at least one operating unit (20) is supported by a first base ((BS2)) which protrudes with respect to a second base ((BS1)) which supports said at least two piece-holder units (3*, 3**).

8. A machine (1) as claimed in claim 1, characterized in that said at least one operating unit (20) is the sole operating unit and supports said at least one operating head (30), as the sole operating head, on which said at least one tool (33; 33A, 33B) and at least a second tool are mounted.

9. A machine (1) as claimed in claim 1 wherein said at least two piece-holder units each comprise a piece-holder table which is rotationally driven to rotate about a respective vertical axis; and
    wherein said at least two piece-holder units each cooperate with a respective operation unit, each operation unit comprising a respective vertical column and including a respective support arm which is configured to support a respective auxiliary device comprising: a device for machining a piece mounted on a respective one of said at least two piece-holder units, and/or for controlling a piece mounted on a respective one of said at least two piece-holder units.

10. A machine (1) for making gears,
    the machine (1) comprising at least two piece-holder units (3*; 3**) and at least one operating unit (20) comprising a first slide (22); said at least one operating unit (20) being equipped with at least one operating head (30) provided with at least one tool (33; 33A, 33B) for machining a piece; said at least two piece-holder units (3*; 3**) and said at least one operating unit (20) each being structurally configured such that each of said at least two piece-holder units are capable of moving in at least a first direction (X1, X2) relative to a position of said at least one operating unit, with each piece-holder unit of said at least two piece-holder units also being moveable with respect to the other piece-holder unit in said first direction (X1, X2);
    wherein said at least one operating unit (20) is suitable to move in a second direction (Y1) substantially perpendicular to said at least first direction (X1, X2);
    wherein said at least one operating unit (20) includes a second slide (25) mounted on a pivoting element (24), said pivoting element (24) being moveable in a third, rotational direction (A) about an axis (W);
    wherein said at least one tool (33; 33A, 33B) is mounted on said second slide (25), said second slide (25) being configured to move in a fourth direction (Y) which is tangential relative to said axis (W);
    wherein said pivoting element (24) is mounted on a third slide (23), said third slide (23) being configured to move in a fifth direction (Z) transversal to said second direction (Y1); and
    wherein said at least two piece-holder units each comprise a piece-holder table which is rotationally driven to rotate about a respective vertical axis.

11. A machine (1) as claimed in claim 10 wherein said fifth direction (Z), in which said third slide (23) is configured to move, is a vertical direction extending vertically and transversal to said second direction (Y1).

12. A machine (1) as claimed in claim 10, wherein said pivoting element (24) is further configured to move in a sixth direction (X3) which is substantially parallel to said at least first direction (X1, X2), and perpendicular to said second direction (Y1).

13. A machine (1) as claimed in claim 10, characterized in that said machine further comprises at least two working stations comprising a first working station (WS1) and a second working station (WS2), said at least two working stations being so configured such that while a first piece is machined in a first working station (WS1), a corresponding second piece is capable of being centered on one respective piece-holder unit of said at least two piece-holder units, and/or a respective piece-holder unit (3*), of said at least two piece-holder units, which corresponds to said second working station (WS2), can be serviced in said second working station (WS2).

14. A machine (1) as claimed in claim 13, further characterized in that said at least one operating unit (20), as the sole operating unit, is configured to move between said at least two working stations ((WS1), (WS2)).

15. A machine (1) as claimed in claim 10, further characterized in that said machine includes at least one tool change station (TC) located next to at least one working station ((WS1), (WS2)).

16. A machine (1) as claimed in claim 10, further characterized in that said at least one operating unit (20) is configured to move to a position to reach a tool change station ((TC)), wherein said at least one tool (33; 33A, 33B) is changed.

17. A machine (1) as claimed in claim 16, characterized in that said at least one operating unit (20) is supported by a first base ((BS2)) which protrudes with respect to a second base ((BS1)) which supports said at least two piece-holder units (3*, 3**).

18. A machine (1) as claimed in claim 10, characterized in that said at least one operating unit (20) is the sole operating unit and supports said at least one operating head (30), as the sole operating head, on which said at least one tool (33; 33A, 33B) and at least a second tool are mounted.

19. A machine (1) for making gears,
the machine (1) comprising at least two piece-holder units (3*; 3**) and at least one operating unit (20) comprising a first slide (22); said at least one operating unit (20) being equipped with at least one operating head (30) provided with at least one tool (33; 33A, 33B) for machining a piece; said at least two piece-holder units (3*; 3**) and said at least one operating unit (20) each being structurally configured such that each of said at least two piece-holder units are capable of moving in at least a first direction (X1, X2) relative to a position of said at least one operating unit, with each piece-holder unit of said at least two piece-holder units also being moveable with respect to the other piece-holder unit in said first direction (X1, X2);
wherein said at least one operating unit (20) is suitable to move in a second direction (Y1) substantially perpendicular to said at least first direction (X1, X2);
wherein said at least one operating unit (20) includes a second slide (25) mounted on a pivoting element (24), said pivoting element (24) being moveable in a third, rotational direction (A) about an axis (W);
wherein said at least one tool (33; 33A, 33B) is mounted on said second slide (25), said second slide (25) being configured to move in a fourth direction (Y) which is tangential relative to said axis (W);
wherein said pivoting element (24) is mounted on a third slide (23), said third slide (23) being configured to move in a fifth direction (Z) transversal to said second direction (Y1); and
wherein said at least two piece-holder units each cooperate with a respective operation unit, each operation unit comprising a respective vertical column and including a respective support arm extending from the respective vertical column such that, for each of the support arms, a respective vertical axis intersects both the respective piece-holder unit and the respective support arm, wherein each support arm is configured to support a respective auxiliary device comprising: a device for machining a piece mounted on a respective one of said at least two piece-holder units, and/or for controlling a piece mounted on a respective one of said at least two piece-holder units.

20. A machine (1) as claimed in claim 19 wherein said fifth direction (Z), in which said third slide (23) is configured to move, is a vertical direction extending vertically and transversal to said second direction (Y1).

21. A machine (1) as claimed in claim 19, wherein said pivoting element (24) is further configured to move in a sixth direction (X3) which is substantially parallel to said at least first direction (X1, X2), and perpendicular to said second direction (Y1).

22. A machine (1) as claimed in claim 19, characterized in that said machine further comprises at least two working stations comprising a first working station (WS1) and a second working station (WS2), said at least two working stations being so configured such that while a first piece is machined in a first working station (WS1), a corresponding second piece is capable of being centered on one respective piece-holder unit of said at least two piece-holder units, and/or a respective piece-holder unit (3*), of said at least two piece-holder units, which corresponds to said second working station (WS2), can be serviced in said second working station (WS2).

23. A machine (1) as claimed in claim 22, further characterized in that said at least one operating unit (20), as the sole operating unit, is configured to move between said at least two working stations ((WS1), (WS2)).

24. A machine (1) as claimed in claim 19, further characterized in that said machine includes at least one tool change station (TC) located next to at least one working station ((WS1), (WS2)).

25. A machine (1) as claimed in claim 19, further characterized in that said at least one operating unit (20) is configured to move to a position to reach a tool change station ((TC)), wherein said at least one tool (33; 33A, 33B) is changed.

26. A machine (1) as claimed in claim 25, characterized in that said at least one operating unit (20) is supported by a first base ((BS2)) which protrudes with respect to a second base ((BS1)) which supports said at least two piece-holder units (3*, 3**).

27. A machine (1) as claimed in claim 19, characterized in that said at least one operating unit (20) is the sole operating unit and supports said at least one operating head (30), as the sole operating head, on which said at least one tool (33; 33A, 33B) and at least a second tool are mounted.

* * * * *